United States Patent [19]

Hitosugi et al.

[11] Patent Number: 5,050,233

[45] Date of Patent: Sep. 17, 1991

[54] ROTARY COMPRESSOR

[75] Inventors: Toshiaki Hitosugi, Numazu; Izumi Onoda, Fuji, both of Japan

[73] Assignee: Kabushiki Kaisha Toshiba, Kawasaki, Japan

[21] Appl. No.: 198,436

[22] Filed: May 25, 1988

[30] Foreign Application Priority Data

Aug. 31, 1987 [JP] Japan ............................. 62-216638

[51] Int. Cl.$^5$ ............................................. F04B 25/00
[52] U.S. Cl. ................................. 417/427; 62/175; 62/196.3; 62/510; 417/428
[58] Field of Search ............... 417/428, 427, 288; 62/175, 510, 196.3

[56] References Cited

U.S. PATENT DOCUMENTS

| | | | |
|---|---|---|---|
| 2,178,100 | 10/1939 | Gygax | 417/295 |
| 2,245,053 | 6/1941 | Sanders, Jr. | 62/175 X |
| 2,550,457 | 4/1951 | Dodson | 417/428 |
| 3,658,440 | 5/1972 | Jackson . | |
| 4,344,297 | 8/1982 | Uneo et al. | 62/196.3 |
| 4,535,602 | 8/1985 | Alsenz et al. | 62/175 |

FOREIGN PATENT DOCUMENTS

| | | | |
|---|---|---|---|
| 93134 | 1/1969 | France | 417/428 |
| 56-4877 | 2/1981 | Japan . | |
| 2176244A | 12/1986 | United Kingdom . | |

Primary Examiner—Leonard E. Smith
Attorney, Agent, or Firm—Cushman, Darby & Cushman

[57] ABSTRACT

A rotary compressor includes first and second compressor sections, and a motor for driving the compressor sections. The first and second compressor sections have first and second cylinders, respectively, and each cylinders has a suction port. First and second suction pipes are connected to the suction ports, and first and second change over valves are provided at the first and second pipes, respectively. The first cylinder has a release port for releasing a port of the gas being compressed in the first cylinder. A release pipe provided with a third changed over valve is connected to the release port. The operaations of the first to third valves are controlled by a control circuit so that the capacity of the compressor varies in the plurality of steps in accordance with the loads applied thereto.

7 Claims, 5 Drawing Sheets

ROTARY COMPRESSOR

BACKGROUND OF THE INVENTION

1. Field of the Invention

The present invention relates to a rotary compressor for driving a refrigeration cycle.

2. Description of the Related Art

The refrigeration cycle in an air conditioning apparatus generally comprises a four-way valve, an indoor heat exchanger, expansion means such as a capillary tube, and an outdoor heat exchanger, all being connected to a rotary compressor of a single cylinder type in this order. A heating or cooling cycle can be attained when the flow passage of the refrigeration cycle is switched by the four-way valve.

Recently, there is provided an air conditioning apparatus of this type wherein a rotary compressor of a capacity-variable type is used so that the capacity of the refrigeration cycle can be varied in response to the loads applied. Generally, this compressor has motor and compressor sections housed in a closed casing, and an inverter circuit is connected to the motor section. The operation frequency for the motor section is changed by the inverter circuit and the number of rotations thereof is thus changed, so that the capacity of the compressor section which is driven by the motor section can be linearly varied.

However, the rotary compressor, whose capacity can be changed by the inverter circuit, has the following problems. As compared with the rotary compressors of the constant rotary type which have no inverter circuit, the rotary compressor with the inverter circuit produces a magnetic sound which is created by the operation of the inverter circuit, and as the capacity of the rotary compressor is enhanced, the number of rotations of the motor section is greatly increased, resulting in increased noise and vibrations. This makes it necessary to improve the quality of those parts which are caused to frictionally contract one another such as the crankshaft and the bearing and to make these parts soundproof. Thus, the manufacturing cost of the compressor with the inverter circuit is higher than that of the constant rotary type compressor.

In addition, a power loss of more than 10% is caused to occur due to the combination of the inverter circuit and the compressor, as compared to the case wherein no inverter circuit is used. Further, the control section which includes the inverter circuit is also very costly.

Japanese Utility Model disclosure No. 59-123681 discloses a two-cylinder rotary compressor. The capacity of the compressor can be changed, without using the inverter circuit, by selectively stopping the compressing operation of one of the cylinders.

In the case of this compressor, however, its capacity can only be changed at two times; when the compressing operation of one of the cylinders is stopped and when the two cylinders are engaged in the compressing operation. As compared with the case wherein the inverter circuit is used, the capacity of this two-cylinder rotary compressor cannot be minutely changed in response to the loads applied.

SUMMARY OF THE INVENTION

The present invention has been made in consideration of the above circumstances and is intended to provide a rotary compressor whose capacity can be variously changed without using an inverter circuit.

In order to achieve the object, according to the present invention, a rotary compressor comprises a motor section; a first compressor section having a first cylinder with a suction port and driven by the motor section to compress gas; a second compressor section having a second cylinder with a suction port and driven by the motor section to compress gas; first valve means for opening and closing the suction port of the first cylinder; second valve means for opening and closing the suction port of the second cylinder; release means for releasing to the outside a part of the gas being compressed in the first compressor section so as to reduce the capacity of the first compressor section; and a control section for controlling the operations of the release means and the first and second value means to change the capacity of the compressor in the plurality of steps in response to the loads applied.

BRIEF DESCRIPTION OF THE DRAWINGS

FIGS. 1 through 3 show a refrigeration cycle provided with a rotary compressor according to an embodiment of the present invention, in which FIG. 1 is a plane view showing the whole of the refrigeration cycle, FIG. 2 is a sectional view showing the compressor, and FIG. 3 is a characteristic view showing the capacity of the compressor and the noise created thereby as its capacity is changed in accordance with the operation modes;

FIGS. 4 through 6 show another refrigeration cycle provided with a rotary compressor according to a second embodiment of the present invention, in which FIG. 4 is a plane view showing the refrigeration cycle, and FIGS. 5 and 6 are characteristic views showing the capacity of the compressor as it is changed during the heating and cooling operations.

DETAILED DESCRIPTION OF THE PREFERRED EMBODIMENTS

Some embodiments of the present invention will be described in detail with reference to the accompanying drawings.

Figure 1:
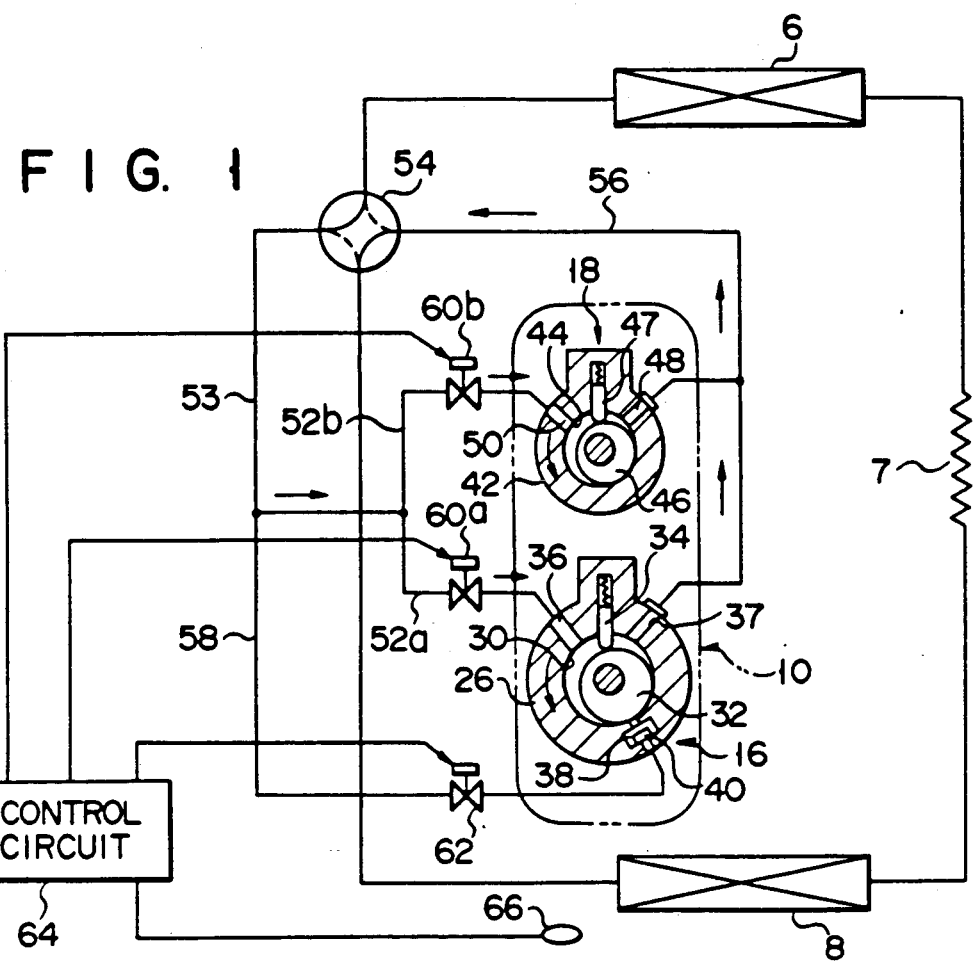

FIG. 1 shows a refrigeration cycle of an air conditioning apparatus provided with two-cylinder rotary compressor 10 according to the present invention. The refrigeration cycle includes four-way valve 54 which is connected to suction and discharge sides of compressor 10, outdoor heat exchanger 6, capillary tube 7, and indoor heat exchanger 8 in this order, thereby constituting a heat pump type refrigeration cycle which can perform cooling and heating operations.

Figure 2:
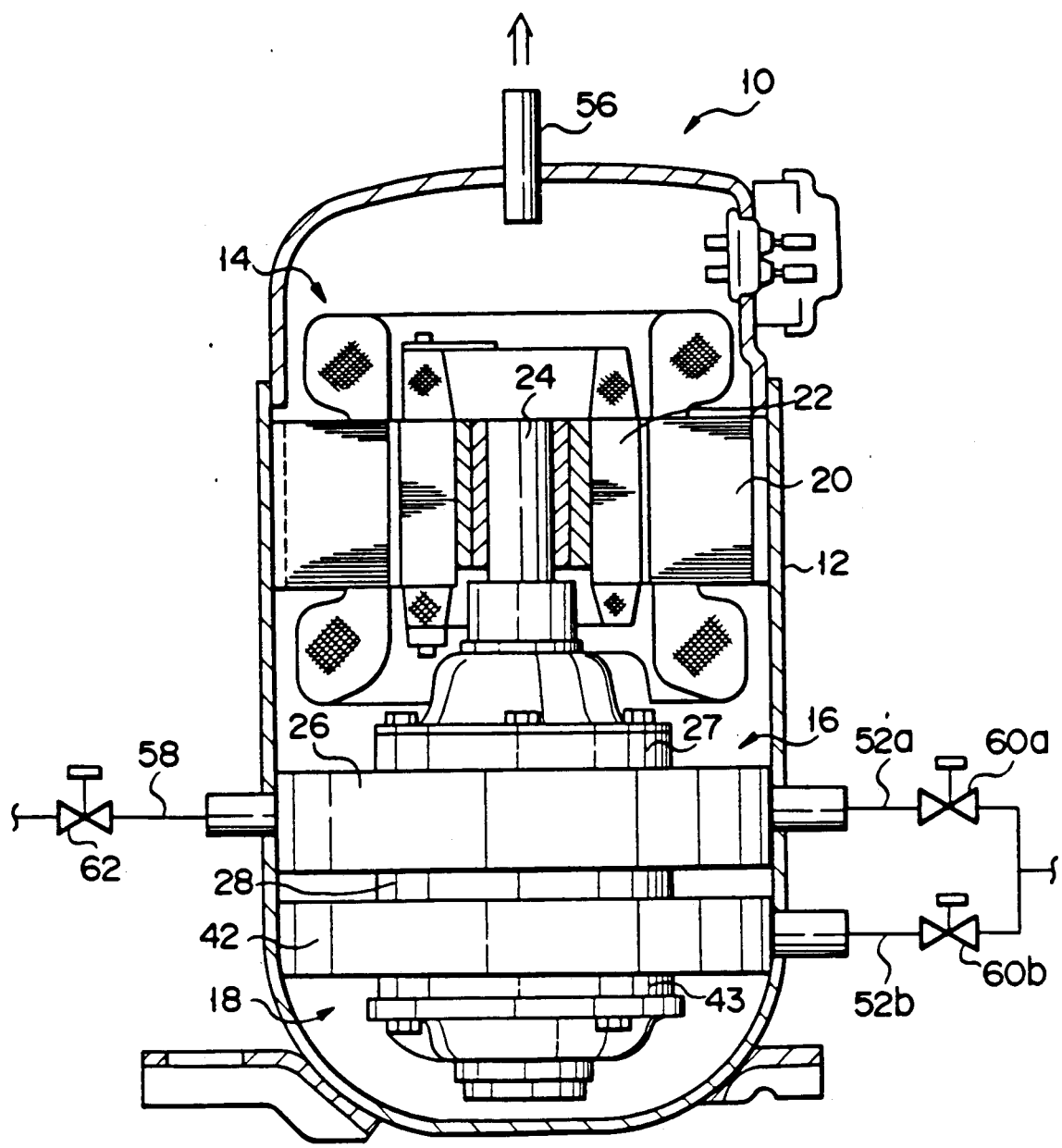

As is shown in FIGS. 1 and 2, compressor 10 has closed casing 12 in which motor section 14 is located at the upper portion thereof and first and second compressor sections 16 and 18 located in series at the lower portion thereof. Motor section 14 has ring-shaped stator 20, fixed to the inner periphery of casing 12, and rotor 22 located in the stator. Drive shaft 24 is fixed to rotor 22 and extends downward from rotor 22.

First compressor section 16 has first cylinder 26, which is fixed to the inner periphery of casing 12 and arranged to be coaxial with drive shaft 24. Further, cylinder 26 is held between main and intermediate bearings 27 and 28, and is in association with them, thereby defining compression chamber 30. Located in compression chamber 30 are eccentrically-rotatable roller 32 and blade 34 which partition the compression chamber into low and high pressure regions. Cylinder 26 is provided with suction port 36 to be open to the low pressure region of compression chamber 30, discharge port 37 is provided to be open to the high pressure region thereof, and release port 38 is provided to be open to compression chamber 30, between these ports 36 and 37. Release valve 40 is located in the release port. A part of the gas being compressed in compression chamber 30 can be released through release port 38. Release valve 40 may be omitted in this embodiment.

Second compressor section 18 has second cylinder 42, which is fixed to the inner periphery of casing 12 and arranged to be coaxial with first cylinder 26. Cylinder 42 is held between intermediate and auxiliary bearings 28 and 43, and is in association with them, thereby defining compression chamber 44. Compression chamber 44 has a volume smaller than or equal to 40% of that of compression chamber 30, for example. Located in compression chamber 44 are eccentrically-rotatable roller 46 and blade 47, and second cylinder 42 is provided with discharge and suction ports 48 and 50, similarly to first compressor section 16.

Drive shaft 24 extends through first and second compressor sections 16 and 18, and is rotatably supported by main and auxiliary bearings 27 and 43. Rollers 32 and 46 located in cylinders 26 and 42 respectively, are each fixed to drive shaft 24. When motor section 14 is energized to rotate rotor 22, rollers 32 and 46 are rotated by drive shaft 24, thereby driving first and second compressor sections 16 and 18.

Suction pipes 52a and 52b are respectively connected to suction ports 36 and 50 of first and second compressor sections 16 and 18. These suction pipes 52a and 52b are projected outside casing 12 and connected in parallel through refrigerant pipe 53 to four-way valve 54. Discharge ports 37 and 48 are open to the inner space of casing 12 and connected to four-way valve 54 through the inner space and discharge pipe 56 fixed to the upper portion of casing 12. Release pipe 58 is connected to release port 38 of first compressor section 16. This pipe 58 extends outside casing 12 and is connected to refrigerant pipe 53.

First and second changeover valves 60a and 60b of an electromagnetic two-way type are provided at suction pipes 52a and 52b. When compressor 10 is driven while first and second changeover valves 60a and 60b are kept open, a parallel discharge operation, in which both of first and second compressor sections 16 and 18 are engaged in compression, is attained. When one of the changeover valves is closed, a single compression operation, in which only one of the compressor sections is engaged in compression, is performed.

At release pipe 58 is provided third changeover valve 62 which is also of the electromagnetic two-way type. When compressor 10 is driven while third changeover valve 62 is closed, a normal operation (a rated operation), in which the refrigerant is compressed using the entire compression chamber 30 of first compressor section 16, is performed. When changeover valve 62 is opened, a release operation, in which a part of the refrigerant being compressed in compression chamber 30 is released to the suction side of the compressor section, is performed. In the release operation, the compression capacity of first compressor section 16 is reduced by about 20-30% as compared with that of the normal operation.

First, second, and third changeover valves 60a, 60b, and 62 are connected to control circuit 64 and their opening and closing are controlled by this control circuit 64. When first to third valves 60a, 60b, and 62 are controlled by circuit 64 so as to variously combine the operations of first and second compressor sections 16 and 18, the capacity of compressor 10 can be changed in five steps. More specifically, compressor 10 can be operated in one of the following operation modes: a first operation mode wherein first and second compressor sections 16 and 18 are engaged in the normal operation; a second operation mode wherein first compressor section 16 is engaged in the release operation while second compressor section 18 is engaged in the normal operation; a third operation mode wherein first compressor section 16 is engaged in the normal operation; a fourth operation mode wherein first compressor section 16 is engaged in the release operation; and a fifth operation mode wherein second compressor section 18 is engaged in the normal operation. The capacity of compressor 10 is reduced step by step from the first to the fifth operation mode. Control circuit 64 sets an appropriate operation mode in accordance with the load of the refrigeration cycle. In this embodiment, circuit 64 is connected to sensor 66 which detects the temperature within a room which is to be conditioned by the air conditioning apparatus, and it selects a desired operation mode in accordance with the difference between the room temperature detected by the sensor and a designated, set temperature.

The volumes of compression chambers 30 and 44 of first and second compressor sections 16 and 18 are set in such a way that the sum of the capacities of these compressor sections is sufficient in meeting any large work demand placed upon it when the heating operation is started, for example, in the first operation mode in which these compressor sections are intended to achieve the normal operation. Further, the volume of compression chamber 44 of second compressor section 18 is set in such a way that compressor 10 has the highest operation efficiency in the fifth operation mode wherein only second compressor section 18 is operated.

The operation of the air conditioning apparatus having the above construction will now be described.

When the heating operation is to be set, a heating mode is set by an operation section (not shown). Four-way valve 54 is thus changed over to a heating position shown by solid lines in FIG. 1, and motor section 14 of compressor 10 is energized to drive first and second compressor sections 16 and 18. At the start of the heating operation, room temperature is low and the difference between the room temperature and a set temperature is accordingly large. Therefore, control circuit 64 turns on (or opens) first and second changeover valves 60a and 60b and turns off (or closes) third changeover valve 62 to maximize the air output from the air conditioning apparatus. Compressor 10 is thus operated in the first operation mode wherein it can effect the highest capacity shown by A in FIG. 3. As a result, the refrigerant discharged from compressor 10 circulates through four-way valve 54, indoor heat exchanger 8, capillary tube 7, outdoor heat exchanger 6, and four-way valve 54, thereby forming a heating cycle with a high capacity due to the parallel operation of the two cylinders.

After the room temperature has risen and the load has been reduced since the heating operation was started or when the difference between the room temperature and the set temperature has been reduced, control circuit 64 turns off third changeover valve 62 and connects release port 38 of first compressor section 16 to the suction side of compressor 10. Compressor 10 is thus operated in the second operation mode wherein it generates a capacity slightly smaller than capacity A, as is shown in B in FIG. 3. As the difference between the room temperature and the set temperature becomes smaller and smaller, control circuit 64 causes compressor 10 to operate in the third, then fourth and finally fifth operation modes. The capacity of compressor 10 is thus gradually lowered as is shown by C, D and E in FIG. 3. When the room temperature nears the set temperature, compressor 10 is operated in the fifth operation mode wherein only second compressor section 18 is operated. In short, in the fifth operation mode compressor 10 maintains a low capacity operation in which the efficiency of the compressor is the highest.

Also in the cooling operation of the air conditioning apparatus, the capacity of compressor 10 is altered stepwise and in accordance with the loads applied. The cooling operation is the same as the heating operation except that four-way valve 54 is switched to change the flow passage of the refrigerant so as to form a cooling cycle, and a detailed description of the cooling operation will therefore be omitted accordingly.

Figure 3:
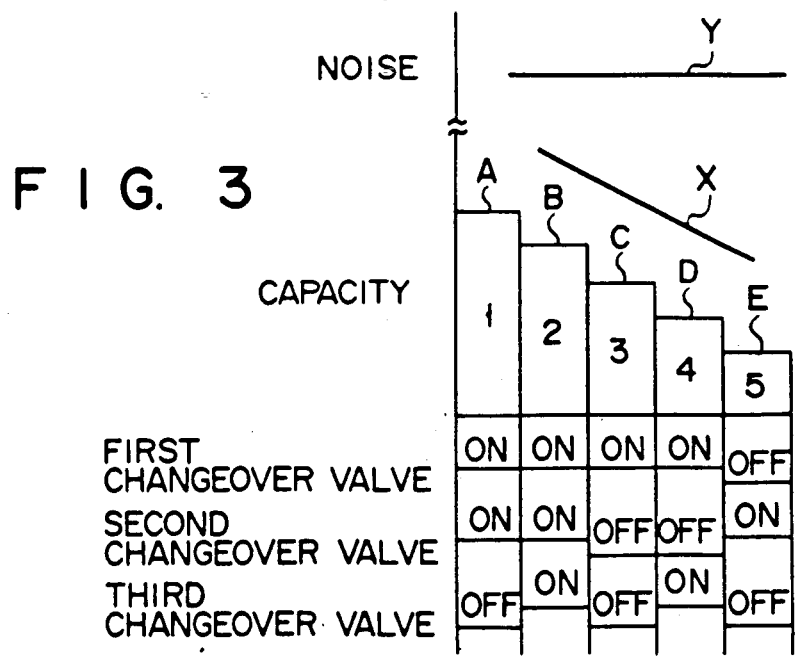

According to the compressor having the abovedescribed arrangement, the first and second compressor sections are provided with the compression chambers having different volumes, the first compressor section is provided with the release means for releasing a part of the refrigerant being compressed, and these compressor sections and the release means are operated in various combinations. Thus, the capacity of the compressor can be varied in five steps without using an inverter circuit. In FIG. 3, line X shows how the capacity of the compressor changes. From this line X, it can be understood that the capacity of the compressor changes almost linearly.

In addition, the capacity of the compressor can be varied without changing the number of rotations of motor section 14, unlike the case wherein an inverter circuit is used. For this reason as is shown by line Y in FIG. 3, noise can be kept at a constant level which is lower than that of the noise made by the compressor provided with the inverter circuit, in spite of the change of the capacity of the compressor. For the same reason, the vibration of the compressor does not increase as the capacity of the compressor is enhanced. Therefore, it is possible to save the expense of replacing those parts which become worn due to contact friction against one another and to make these parts sound-proof. Further, the inverter circuit itself and a control mechanism for the inverter circuit can be omitted from the rotary compressor. As a result, the manufacturing cost of the compressor can be greatly reduced.

Furthermore, since the compressor is not provided with an inverter circuit, it requires a smaller current than the compressor wherein an inverter circuit is used. In addition, the compressor can be operated with high efficiency since it is operated for a longer time in the fifth operation mode than in any other mode, and, during the fifth mode, only the second cylinder having a small volume is used. As the result, a large amount of energy is saved during the operation of the compressor.

Although the first and second compressor sections 16 and 18 have compression chambers which are different in volume in the above-described example, these compression chambers may have the same volume. In this case, the capacity of the compressor will be varied in four steps.

Figure 4:
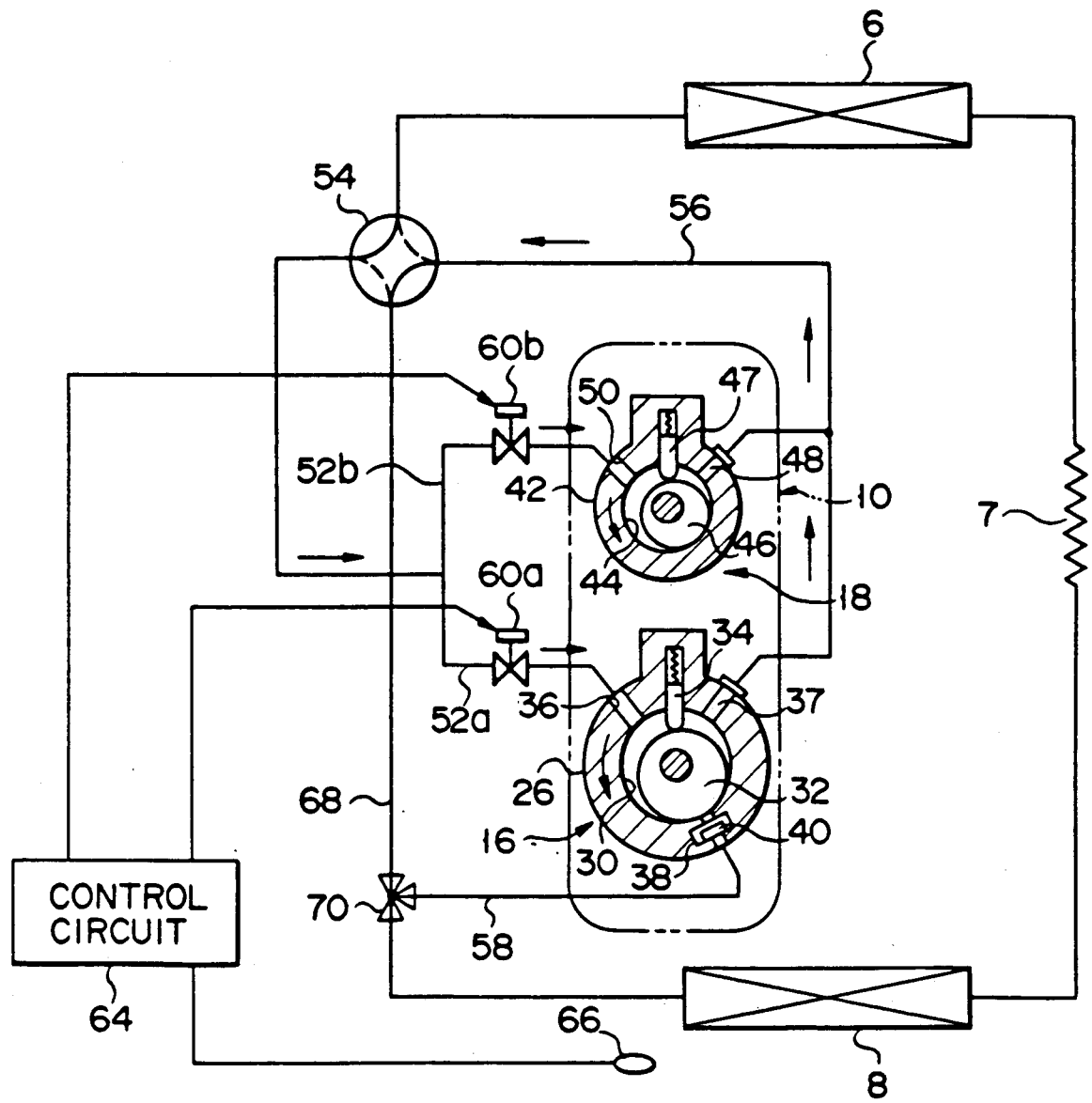
Figure 5:
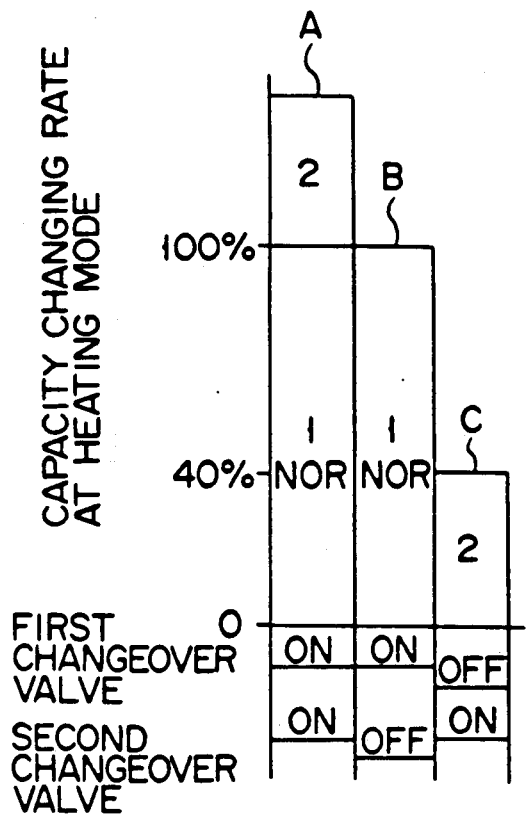
Figure 6:
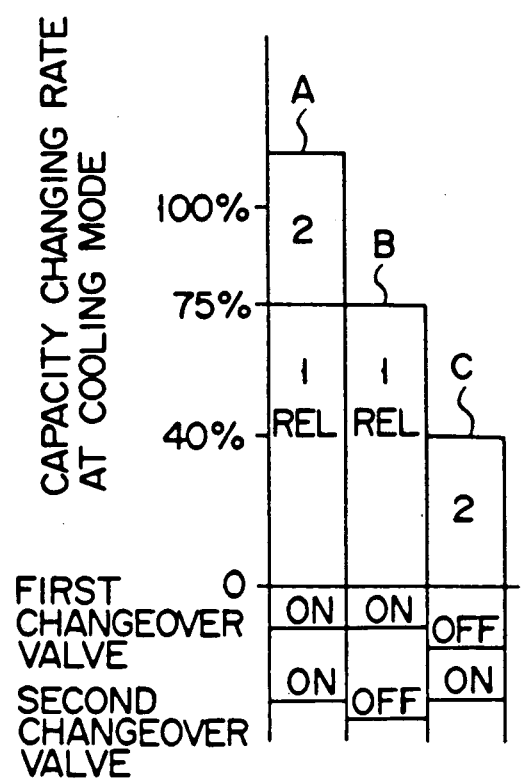

FIGS. 4 through 6 show a second embodiment of the present invention.

In this second embodiment, release pipe 58 is connected at one end to release port 38 of first cylinder 26 and at the other end between four-way valve 54 and indoor heat exchanger 8. Release pipe 58 is provided with no changeover valve. The other arrangement of the second embodiment is the same as the first embodiment and the same parts as those in the first embodiment will be represented by the same reference numerals, and a description thereof will be omitted.

According to the second embodiment, release port 38 communicates with the low pressure side of the refrigeration cycle through release pipe 58 when the air conditioning apparatus is engaged in the cooling operation. Therefore, release valve 40 in release port 38 is automatically opened, and first compressor section 16 is usually in the release operation mode during the cooling operation. When the air conditioning apparatus is engaged in the heating operation, release port 38 communicates with the high pressure side of the refrigeration cycle through release pipe 58. Release valve 40 is thus automatically closed, and first compressor section 16 is usually in the normal operation mode during the heating operation.

It is assumed that the capacity of first compressor section 16 during the normal operation is 100, that the capacity of second compressor section 18 during the normal operation is 40, and that the capacity of first compressor section 16 during the release operation is 75. When first and second changeover valves 60a and 60b are switched as is shown in FIG. 5, during the heating operation, the operation mode of compressor 10 is changed in three steps. In other words, compressor 10 can be operated in the following three modes: a first operation mode wherein both of first and second compressor sections 16 and 18 are engaged in the normal operation; a second operation mode wherein first compressor section 16 is engaged in the normal operation; and a third operation mode wherein second compressor section 18 is engaged in the normal operation. The capacity ratio of the compressor in these operation modes is 140:100:40. When first and second changeover valves 60a and 60b are switched as is shown in FIG. 6, during the cooling operation, compressor 10 is changed in three steps: a first operation mode wherein first compressor section 16 is engaged in the release operation while second compressor section 18 is engaged in the normal operation; a second operation mode wherein first compressor section 16 is engaged in the release operation; and a third operation mode wherein second compressor section 18 is engaged in the normal operation. The capacity ratio of the compressor in these operation modes is 115:75:40.

As in the first embodiment, first and second changeover valves 60a and 60b are switched in accordance with the loads by means of control circuit 64.

Also in the second embodiment having the above mentioned construction, the capacity of the compressor can be changed in a plurality of stages, without using the inverter circuit. The capacity changing rate of the compressor can also be changed during the air cooling and heating operations and the rated capacities suitable for those loads applied during the air cooling and heating operation times can be set independently of one another. In the second embodiment, as is shown by the two-dot line in FIG. 4, when three-way valve 70 is arranged at the junction of release pipe 58 and cooling medium pipe 68 which extends between four-way valve 54 and indoor heat exchanger 8, and the opening and closing of this three-way valve 70 are controlled by control circuit 64, the capacity of the compressor can be changed in five steps as in the first example.

Figure 7:
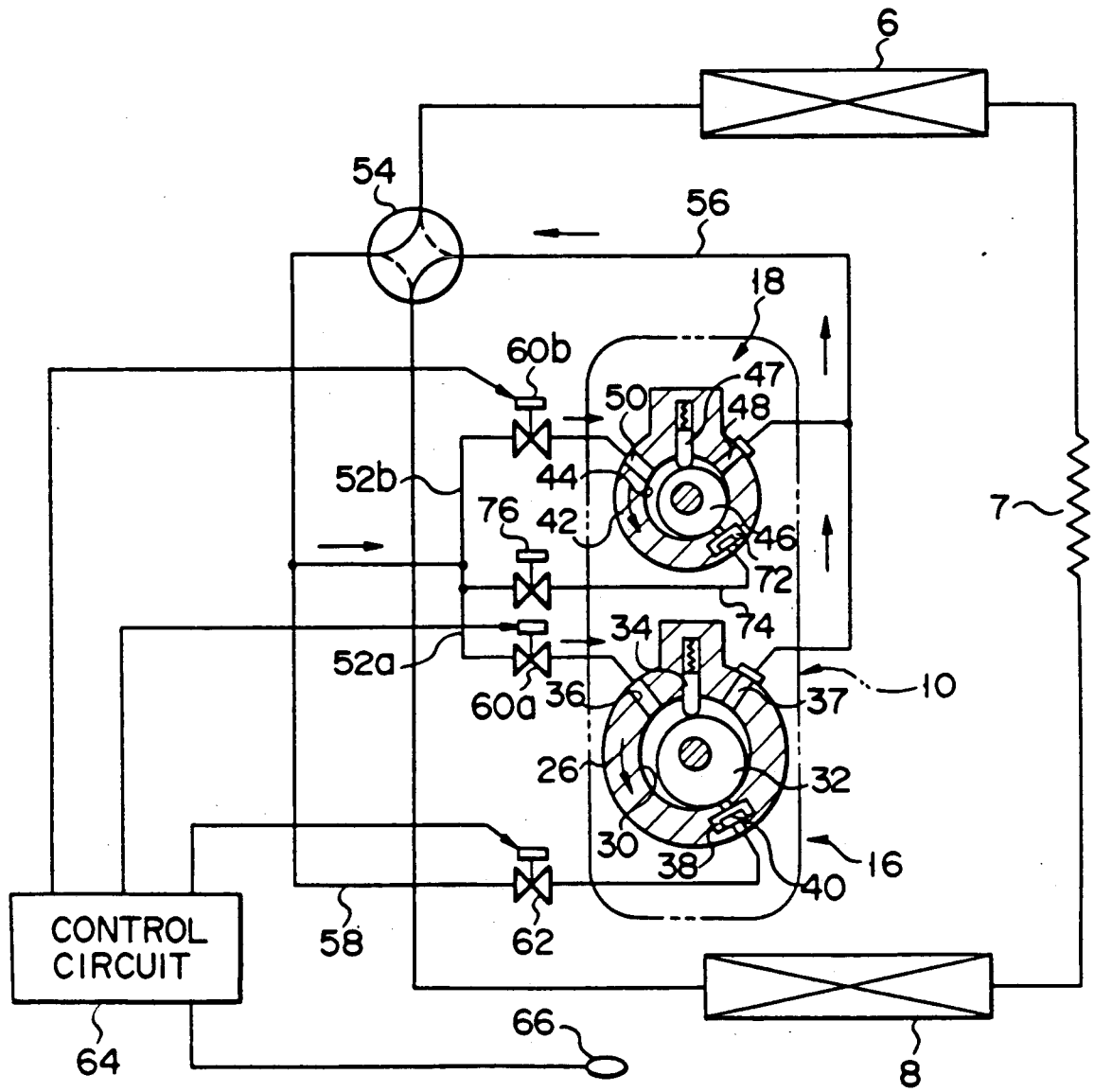
FIG. 7 is a plane view showing another refrigeration cycle provided with a rotary compressor according to a third embodiment of the present invention.

FIG. 7 shows a third embodiment of the present invention. This embodiment is different from the first embodiment in that second compressor section 18 is provided with a release means. Namely, second cylinder 42 is provided with release port 72 which is connected to the suction side of compressor 10 through release pipe 74. At release pipe 74 is provided fourth change-over valve 76 which is opened and closed by control circuit 64.

The other arrangement of the third embodiment is same as the first embodiment. The same parts as those in the first embodiment will be denoted by the same reference numerals and the descriptions thereof will be omitted.

According to the third embodiment having the abovedescribed arrangement, when fourth changeover valve 76 is opened, a release operation of second compressor section 18 can be performed. Thus, by combining the release operation of second compressor section 18 with another operation of compressor 10, the capacity of compressor 10 can be changed in eight steps. Therefore, the capacity of the compressor can be varied more linearly.

What is claimed is:
1. A rotary compressor comprising:
   a motor section;
   a first compressor section having a first cylinder with a suction port and driven by the motor section to compress gas;
   a second compressor section having a second cylinder with a second suction port and driven by the motor section to compress gas, the second cylinder having a volume different from the of the first cylinder;
   first valve means for opening and closing the suction port of the first cylinder;
   second valve means for opening and closing the second suction port of the second cylinder;
   release means for releasing a part of the gas being compressed in the first compressor section so as to lower capacity of the first compressor section; and
   a control section for controlling operation of the release means and the first and second valve means to change capacity of the compressor in accordance with loads applied thereto, said control section selectively setting, in response to the loads applied thereto, a first operation mode wherein the first and second valve means are opened while the release means is left in an inoperative state; a second operation mode wherein the first and second valve means are opened while the release means is made operative; a third operation mode wherein the first and second valve means are opened and closed, respectively, while the release means is left in an inoperative state; a fourth operation mode wherein the first and second valve means are opened and closed, respectively, while the release means is made operative; and a fifth operation mode wherein the first and second valve means are closed and opened, respectively while the release is left in an inoperative state.

2. A rotary compressor according to claim 1, wherein said release means includes a release port formed in the first cylinder, a release pipe for connecting the release port to the suction side of the compressor, and a valve arranged in the release pipe to be opened and closed by the control section.

3. A rotary compressor according to claim 1, wherein said release means includes a release port formed in the first cylinder, a release pipe connected to the release port, and a release valve arranged in the release port so as to open and close it in response to pressures in the release pipe.

4. A rotary compressor according to claim 1, wherein said volume of the second cylinder is smaller than that of the first cylinder.

5. A rotary compressor according to claim 4, wherein said second cylinder has such a volume that the capacity of the compressor is reduced to a minimum while engaged in the fifth operation mode.

6. A rotary compressor according to claim 4, which further comprises second release means for releasing a part of the gas being compressed in the second compressor section so as to lower the capacity of the second compressor section, said second release means being selectively made operative in response the loads applied by means of the control section.

7. A rotary compressor according to claim 6, wherein said control section has an operation mode wherein the first and second valve means are opened and the first release means is left in an inoperative state while the second release means is made operative; an operation mode wherein the first and second valve means are opened and the first and second release means are made operative; and an operation mode wherein the first and second valve means are closed and opened respectively and the first release means is left in the inoperative state while the second release means is made operative.

* * * * *